United States Patent [19]

Gelardi et al.

[11] Patent Number: 4,540,090

[45] Date of Patent: Sep. 10, 1985

[54] CASSETTE STORAGE CONTAINER

[75] Inventors: Paul J. Gelardi, Cape Porpoise; Robert B. MacLeod, Jr., Biddeford, both of Me.

[73] Assignee: Shape, Inc., Biddeford, Me.

[21] Appl. No.: 620,816

[22] Filed: Jun. 15, 1984

[51] Int. Cl.³ .............................................. B65D 85/67
[52] U.S. Cl. ................................. 206/387; 220/337; 220/338
[58] Field of Search ................. 220/337, 338, 324; 206/387

[56] References Cited

U.S. PATENT DOCUMENTS

| | | | |
|---|---|---|---|
| 3,045,860 | 7/1962 | Harvey | 220/338 |
| 3,087,642 | 4/1963 | Caparone et al. | 220/324 |
| 3,151,899 | 10/1964 | Kelley | 220/324 |
| 3,315,796 | 4/1967 | Dreyfuss | 220/338 |
| 3,458,113 | 7/1969 | Swartzbaugh | 220/324 |
| 3,786,982 | 1/1974 | Rakes et al. | 220/324 |
| 4,029,234 | 6/1977 | Johnson, Jr. et al. | 220/338 |
| 4,209,114 | 6/1980 | Wilson et al. | 220/338 |
| 4,231,474 | 11/1980 | Takahashi | 206/387 |
| 4,235,334 | 11/1980 | Ahn | 206/387 |
| 4,293,266 | 10/1981 | St. Lawrence et al. | 206/387 |

*Primary Examiner*—Joseph Man-Fu Moy
*Attorney, Agent, or Firm*—Staas & Halsey

[57] ABSTRACT

A transparent tape cassette storage container having a cover and a base and using a latching mechanism employing a projection on the cover and an interference recess in the base for receiving the projection. The interference in the latch is just enough so that it holds the base and cover securely, but also unsnaps easily when the user wishes to open the container. There is also used a pivoting mechanism to hinge the cover relative to the base. Finally, the front of the cover includes indentations and the base includes serated projections for aiding handling of the cassette storage container during opening and closing.

2 Claims, 5 Drawing Figures

CASSETTE STORAGE CONTAINER

BACKGROUND OF THE INVENTION

This invention relates to a tape cassette, and more particularly to videotape cassette storage container pivoting and latching mechanisms.

A tape cassette storage container is used to protect a tape cassette and the tape therein while the tape cassette is not in use. A tape cassette storage container usually includes a base and a cover. The cover may be kept closed by some type of latching mechanism and may be hinged to pivot into opened or closed positions relative to the base.

More particularly, the following patents are directed to devices having latching mechanisms in which a movable catch or seal is used to lock the storage container in the closed position:

| U.S. PAT. NO. | INVENTOR(S) | ISSUE DATE |
|---|---|---|
| 3,990,575 | Egly et al. | 11/9/76 |
| 4,078,657 | Schurman | 3/14/78 |

Alternatively, latches are known in which a projection, located on the front wall of a cover or base and extending in a direction parallel to the cover, is inserted in a direction parallel to the plane of the base into a correspondingly shaped hole (not a recess) formed in the front wall of the base. Examples of this type of latch mechanism are shown in the following patents:

| U.S. PAT. NO. | INVENTOR(S) | ISSUE DATE |
|---|---|---|
| 4,102,452 | Sato et al. | 7/25/78 |
| 4,231,474 | Takahashi | 11/4/80 |
| 4,363,403 | Raucci Jr. et al. | 12/14/82 |

With these types of latching mechanisms, pressing the thumb against the front of the storage container in order to open the storage container may actually create pressure against the latch which may "bind" or jam the latch, thus making opening difficult.

Finally, as shown in U.S. Pat. No. 3,876,071, issued to Neal et al., a latch mechanism uses a pair of keepers formed along the front and side walls for receiving in latching arrangement a continuous wall-like rib formed along the outside edge of the cover.

However, the Neal et al. '071 patent does not produce a dependable and easy to use latch. This is evidenced by the fact that a later patent to the same inventors, i.e., U.S. Pat. No. 4,011,940, discloses a similar latch to that shown in the '071 patent, but also counsels the need for an additional pair of latches comprising buttons formed on flexible hinges extending from the base which are fitted into holes in the cover. These two pair of latches make the storage container expensive and difficult to use.

There is also known in the prior art various hinges to be used with a cover and base of a tape cassette container. For example, usually a simple pair of cylindrical pins are formed in the base and are inserted into a corresponding pair of circular holes formed in the cover, or vice versa. The following U.S. patents are examples of this type of design:

| U.S. PAT. NO. | INVENTOR(S) | ISSUE DATE |
|---|---|---|
| 3,272,325 | Schoenmakers | 9/13/66 |
| 3,620,361 | Fugiwara et al. | 11/16/71 |
| 4,378,066 | Sato et al. | 3/29/83 |

The Sato et al. '066 patent also teaches the use of semicircular spacers formed at the base of each pivot pin and quarter-circular spacers formed near each hole on the cover. These spacers ensure that the walls of the cover and the base will not scrape against each other and create damaging dust when the storage container is opened and closed. In addition, since these spacers do not overlap, they limit the angle the cover can make relative to the base when the storage container is opened.

Moreover, the above patents do not teach a pivoting mechanism assuring positive positioning of the cover relative to the base while in either the opened or closed positions. That is, the pivoting mechanisms of the prior art devices are not capable of holding the storage container in the opened or closed positions, nor are they capable of preventing free swinging of the cover between the opened and closed positions.

Finally, it has been known to employ transparent covers for storage containers, such as a tape cassette container. For example, in U.S. Pat. No. 4,154,338 there is employed a transparent cover for a tape cassette. However, there is not known in the prior art the combination of a clear cassette container cover or base used in combination with a reliable and easy to use pivot and/or latch mechanism.

Thus, it can be seen that known prior art tape cassette storage containers have some drawbacks. None of the known prior art devices have the novel features of the invention disclosed herein for eliminating such drawbacks, while still providing an economically manufactured tape cassette storage container.

SUMMARY OF THE INVENTION

Accordingly, it is an object of the present invention to provide a tape cassette storage container having a latching mechanism which firmly and dependably closes and holds closed the cover on the base of the storage container, while still allowing for easy opening of the container.

It is another object of the present invention to provide a tape cassette storage container having a pivoting mechanism which facilitates the opening and closing of the container.

It is another object of the present invention to provide a tape cassette storage container having a pivoting mechanism which positively positions the cover in relation to the base, both in the opened and closed positions.

It is another object of the present invention to provide a tape cassette storage container having the pivoting and latching mechanisms discussed above which also is transparent to allow the user to see through the container to the cassette.

Finally, it is an object of the present invention to provide a transparent tape cassette storage container having unique pivoting and latching mechanisms, and which is economically and efficiently manufactured and assembled, durable and, most importantly, easy to use.

To achieve the foregoing and other objects of the present invention, and in accordance with the purposes of this invention, there is provided a tape cassette storage container having a base and a cover held closed by a latching mechanism comprising a projection located on the front wall of the cover which is inserted in a direction perpendicular to the plane of the base into an interference recess formed in the base. The interference fit created thereby is just enough so that it holds the base and cover securely, but also unsnaps easily when the user wishes to open the container.

There is provided a tape cassette storage container having a base and a cover hinged by a pivoting mechanism having a hole formed in each side wall of the cover and corresponding pins formed on each side of the base. In addition, the rear wall of the base of the cassette is rounded to facilitate opening of the cover relative to the base. In an alternate embodiment of the pivoting mechanism each hole may have protuberances extending therein and each pin may have open areas, curved sides and flat sides. The pins of this alternate embodiment are inserted into the corresponding holes, and during use of the storage container, the protuberances formed in the holes, and the open areas, the curved sides and the flat sides of the pins combine to positively position the cover relative to the base in either the opened or closed positions.

Finally, there is provided a tape cassette storage container having the above-discussed pivoting and/or latching mechanisms, an area for gripping the cassette and a transparent cover, thus allowing the user to be able to reliably hold the cassette during opening and closing and to be able to see through to the cassette or a label insert surrounding or affixed to the cassette, respectively.

Additional objects and advantages of the invention will be set forth in part in the description which follows, reference being made to the accompanying drawings forming a part hereof, and, in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification illustrate embodiments of the invention and, together with the description, serve to explain the principles of the invention.

DETAILED DESCRIPTION OF THE PREFERRED EMBODIMENTS

Figure 1:
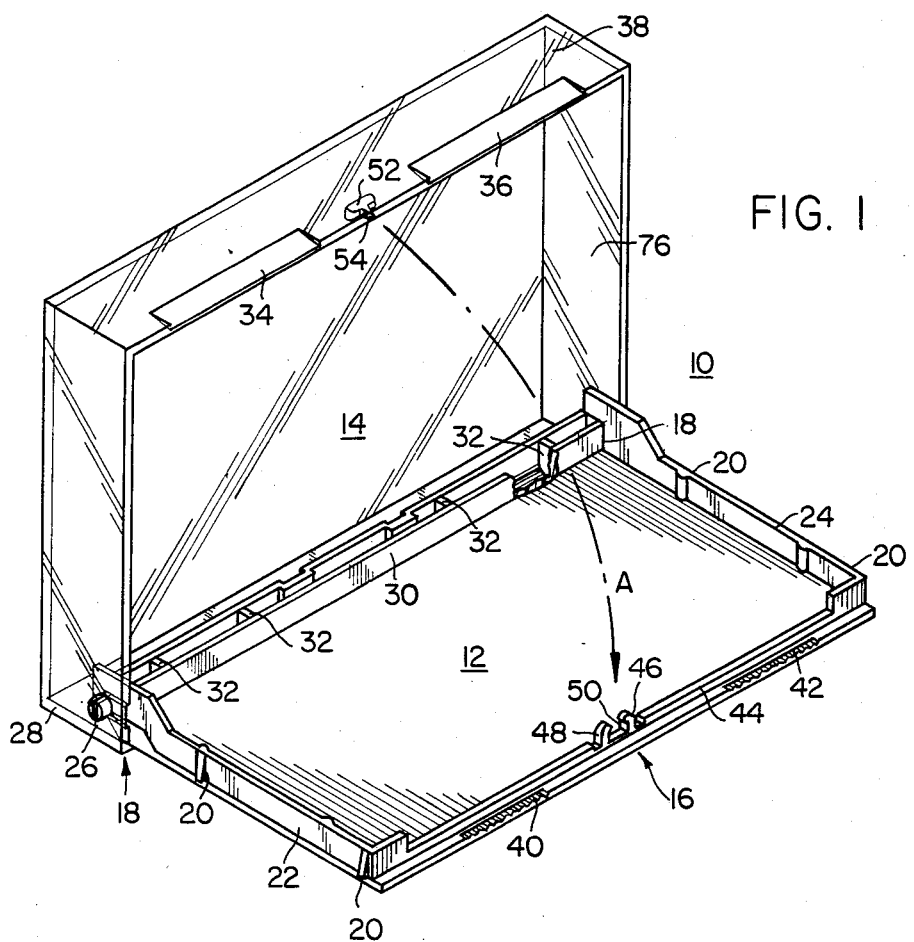
FIG. 1 is a perspective view of the tape cassette storage container of the present invention in the opened position.

As shown in FIG. 1, the tape cassette storage container is denominated by the reference numeral 10. This storage container 10 has a generally flat and substantially rectangular configuration which may be formed of plastic. The storage container 10 generally comprises a base 12, a cover 14, a latch mechanism 16, and a pivoting mechanism 18. Of course, FIG. 1 shows the storage container 10 in the opened position and arrow "A" indicates the movement of the cover 14 relative to the base 12 when being closed.

The present invention's base 12 preferably includes inclined ribs 20 formed on the outsides of the left and right side walls 22 and 24, respectively. The purpose of these ribs 20 is to minimize the "play" between the cover 14 and the base 12 in the closed position, which might lead to damage of the cover 14 and/or base 12.

Figure 3:
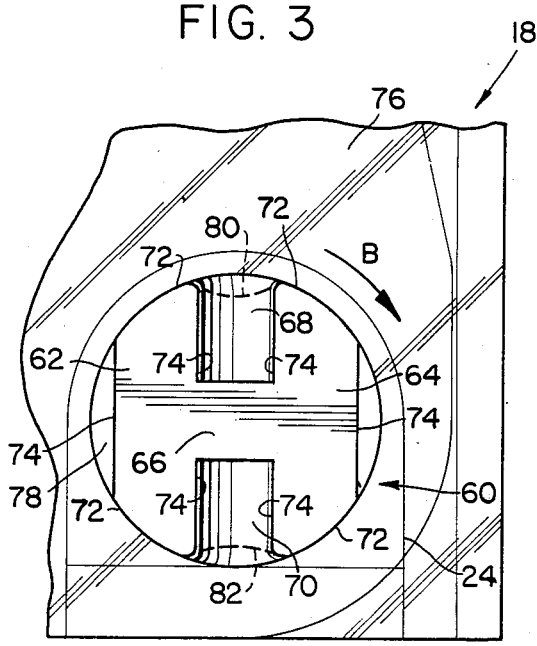
FIG. 3 is a right side view of the pivoting mechanism of the present invention with the cover in the opened position.
Figure 4:
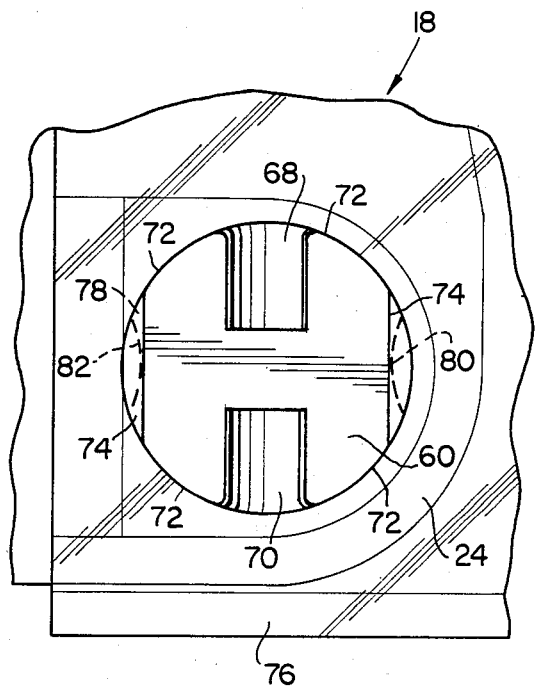
FIG. 4 is a right side view of the pivoting mechanism of the present invention with the cover in the closed position.

In addition, the present invention's base 12 includes a rear wall 26 with a rounded bottom (as best seen in FIGS. 3 and 4) to facilitate rotation of the rear wall 28 of the cover 14 relative to the rear of the base 12. The rear wall 26 of the base 12 is reinforced by another wall 30 running parallel and being connected thereto by reinforcing members 32. The reinforcement wall 30 helps to stiffen the rear of the base 12 for greater durability.

The cover 14 also has elongated indentations 34 and 36 formed along the outside of a front wall 38 thereof and the base 12 has two corresponding series of serated projections 40 and 42 on the outside of a front wall 44 for receiving the thumbs during opening and closing of the cassette storage container. More particularly, a "right handed" user might place the thumb of the left hand against the serated projection 40 and the thumb of the right hand against the indentation 36. A "left handed" individual might instead use the serated projection 42 and the indentation 34.

The latching mechanism 16 of the present invention will now be described.

Figure 2:
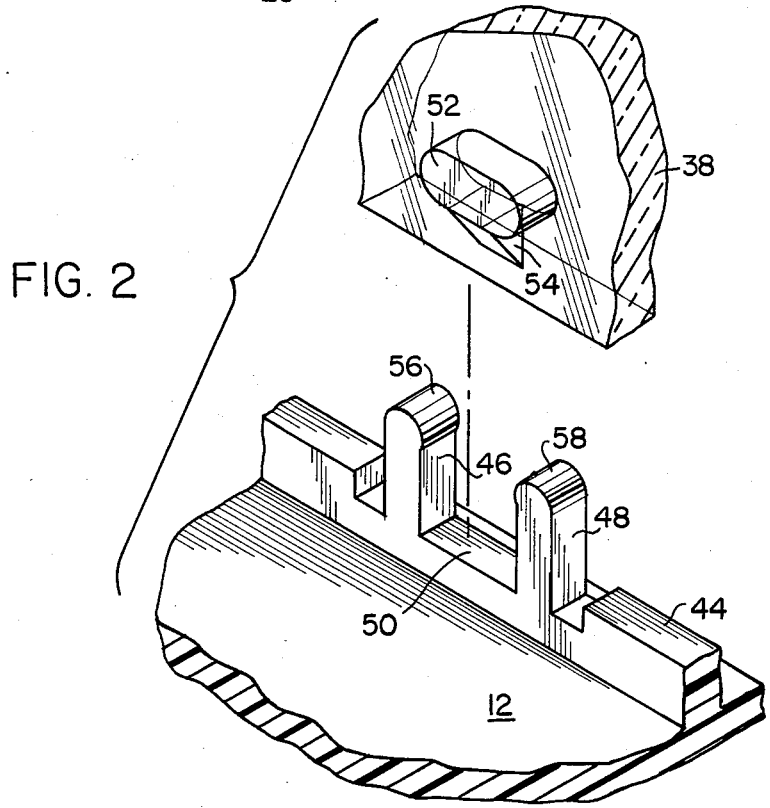
FIG. 2 is an exploded perspective view of the latching mechanism of the present invention, illustrating particularly the projection located on the cover and the interference recess located on the base, which together form a latch for easy one-thumb opening and secure closing of the storage container.

As can be seen from FIGS. 1 and 2, at the central, front edge of the wall 44 there is formed two upright latch members 46 and 48 creating an interference recess 50 therebetween. Each latch member 46 and 48 is substantially rectangular but has rounded free ends 56 and 58, respectively.

On the front wall 38 of the cover 14, a latch projection 52 is formed having a shape which is substantially oval. Adjacent to the latch projection 52 is a support 54 for reinforcing the latch projection 52.

In regard to the operation of the latch mechanism 16, the latch projection 52 on the cover 14 is moved toward the wall 44 of the base 12, and is inserted in a direction perpendicular to the plane of the base 12 into the recess 50 while using a small amount of pressure. The pressure is required to move the latch projection 52 past the rounded ends 56 and 58 of the latch members 46 and 48, respectively. Once the latch projection 52 is within the interference recess 50, the rounded ends 56 and 58 of the latch members 46 and 48, respectively, prevent the projection 52 from unintentionally leaving the recess 50 unless the requisite pressure is exerted to pull the cover 14 away from the base 12.

Generally, the latch on a cassette storage container must reliably hold the container closed, but must also be released relatively easily. If the latch of a storage container is too difficult to release, one could break the storage container or spill the contents when pulling the storage container apart. More particularly, a tape cassette storage container tends to be opened like a book. Generally a thumb is pressed against the front wall of the storage container of the present invention, i.e., the wall containing the latch, and the cover is pulled away from the base. If the prior art types of latches or catches are similarly manipulated, the thumb creates pressure against the latch or catch, actually making it more difficult to release the catch or latch. Thus, thumb pressure does not "bind" or "jam" the latching mechanism 16 of the present invention. The present invention employs an interference recess 50 to hold the cover 14 and the base 12 securely together in the closed position; however, the latch mechanism 16 also unsnaps quite easily when one wishes to open it.

The pivoting mechanism 18 will now be described. Although the following discussion refers only to the right side of the cassette storage container 10, it is to be understood that an identical pivoting mechanism 18 is positioned on the left side of the storage container 10 as is clear from FIG. 1.

As best seen in FIGS. 1 and 3–5, the preferred embodiment of the pivoting mechanism 18 comprises a pin 60 formed on the right side 24 of the base 12. The pin 60 has a first member 62 and a second member 64 linked by a third cross member 66. The third member 66 adds strength to the pin 60. Between the first and second members 62 and 64 there remain recesses 68 and 70. Each of the first and second members 62 and 64, respectively, comprises curved opposite sides 72 and flat opposite sides 74.

Figure 5:
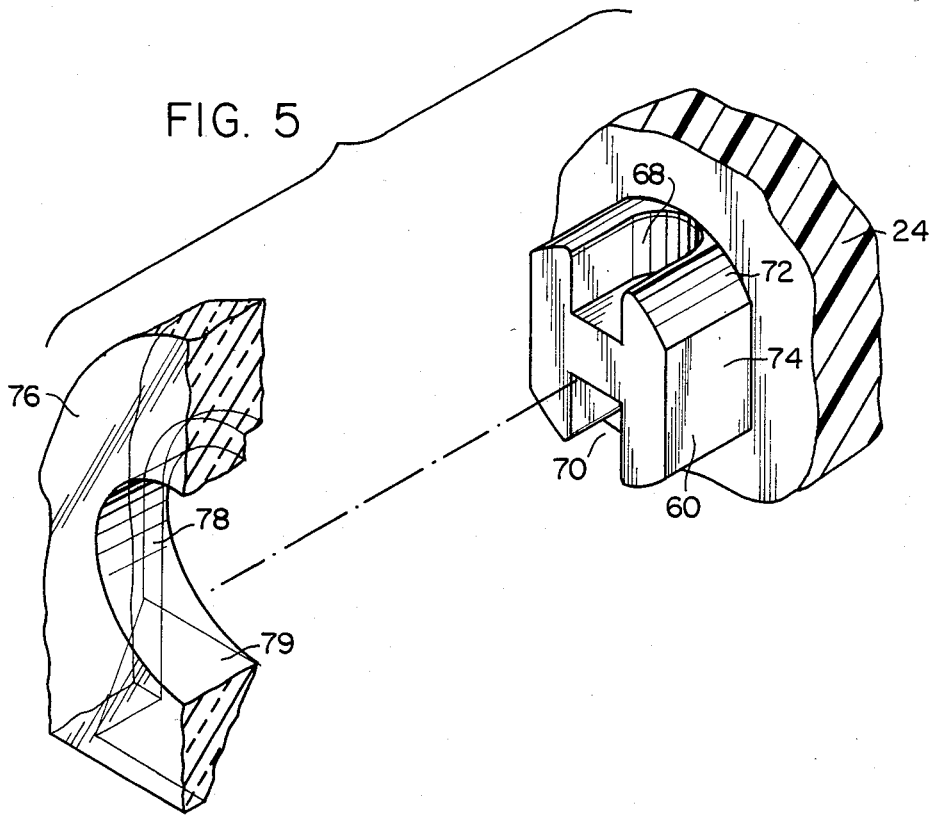
FIG. 5 is an exploded perspective view of the pivoting mechanism of the present invention, illustrating particularly a pin formed in the cover and a hole formed in the base.

On the right side 76 of the cover 14 of the preferred embodiment there is formed a circular hole 78 for receiving the pin 60. An inclined recess 79 is formed in the cover 14 adjacent to the hole 78 to facilitate assembly of the pin 60 into the hole 78, as shown in FIG. 5.

During operation of the preferred embodiment of the pivoting mechanism 18, the pin 60 rotates freely within the hole 78, while the back wall 28 of the cover 14 is allowed to easily move past the rounded back wall 26 of the base 12.

In an alternate embodiment of the pivoting mechanism 18, there is formed in the cover 14 a first protuberance 80 and a second protuberance 82 which extend into each hole 78. The first and second protuberances 80 and 82, respectively, are positioned opposite each other relative to the hole 78. The first protuberance 80 and the second protuberance 82 are curved in shape.

The operation of this alternate embodiment of the pivoting mechanism 18 of the present invention will now be described. As seen in FIG. 3, the areas 68 and 70 formed between the first member 62 and the second member 64 of pin 60 receive the first and second protuberances 80 and 82, respectively, when the storage container 10 is in the opened position. In this position, the cover 14 is positively positioned relative to the base 12, i.e., the cover 14 is held in this position until slight pressure is exerted upon the cover 14 to move it out of the fully opened position.

In contrast, when the storage container 10 is being closed, i.e., when the cover 14 is moved relative to the base 12 as is indicated by arrow "B" in FIG. 3, the first and second protuberances 80 and 82, respectively, leave the areas 68 and 70 and move along the curved sides 72 on the pin 60. As the pin 60 is moving relative to the hole 78, the first and second protuberances 80 and 82 are abutting the curved walls 72 with sufficient pressure to ensure that rotation is gradual and predictable, thus preventing unpredictable swinging of the cover 14. Finally, the first and second protuberances 80 and 82, respectively, come to rest along the flat surfaces 74 of the pin 60, thus assisting in positively holding the cover 14 in the closed position. The closed position is shown in FIG. 4.

This alternate embodiment of the pivoting mechanism 18 of the present invention provides positive positioning of the cover 14 in both the opened and closed positions. The protuberances 80 and 82 function as interference fits against sides 72 between the opened and closed positions, and as "stops" when either inserted into areas 68 and 70 or abutting against sides 74. Together, the pins 60 and the holes 78 positively position the cover 14 relative to the base 12 in either the opened or closed positions and provide predictable, smooth movement therebetween.

The transparent feature of the tape cassette storage container 10 will now be described.

The tape cassette storage container 10 of the present invention preferably uses an opaque plastic for the base 12 and a transparent or clear cover 14. The cover 14 is made transparent or clear to enable one to see through the cover 14 to the cassette or to see an insert or label on the cassette inside the storage container 10. More particularly, graphics can be used on cassette labels or on a separate insert applied over the cassette. Overall, a transparent or clear cover gives the tape cassette storage container a cleaner, more appealing appearance, while adding to its functionality. The type of plastic used to make the base and cover preferably has good impact strength and good clarity characteristics.

In the prior art, transparent or clear covers and/or bases are usually not combined with pivot or latch mechanisms because it is believed that either transparent plastics are too brittle for operation of the prior art pivot and/or latch mechanisms, or that the type of plastic strong enough to withstand the operational requirements of the prior art pivot and/or latch mechanisms would have inferior clarity characteristics. However, due to the efficient, predictably smooth operation of the various embodiments of the pivot and latch mechanisms according to the present invention, relatively less strong plastics having good clarity characteristics may be used in the present invention without damage. The best example of a plastic to be used with the present invention having good strength and clarity is known in the art as K-Resins. K-Resins are a familily of resinous polymers of butadiene and styrene.

It can be seen from the above description that the present invention provides a tape cassette storage container which: (1) comprises relatively few parts; (2) has a pivoting mechanism allowing positive positioning of the cover relative to the base in either the opened or closed positions; (3) is relatively easy to open and close; (4) has a latching mechanism providing dependable closure of the storage container, thus providing a more durable and dependable storage container; and (5) has a cover which allows the user to see through the storage container to the cassette.

The above-described cassette storage container has been described to be of the type intended for use in videotape cassettes. However, the invention can be similarly applied to tape cassettes for use in audio or other recording and/or reproducing apparatus.

The foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention and the appended claims and their equivalents.

For example, although it has been described that the pins 60 are formed on the base 12 and the holes 78 are formed in the cover 14, the present invention contemplates the pins 60 being formed on the cover 14 and the holes 78 being formed in the base 12. However, since molding the pins 60 on the cover 14 and the holes 78 in the base 12, is more expensive, the preferred construction is described in detail above. The same molding considerations are relative to orientation of the latch mechanism 16 and the inclined ribs 20. For example, although the positions of the interference recess 50 and latch projection 52 could be reversed, the preferred construction is described in detail above.

We claim:

1. A videotape cassette storage container capable of opened and closed positions and having a cover with a front, a back and sides and a base with a front, a back and sides, comprising:
   (a) a pivoting mechanism allowing movement of the cover relative to the base having
      (i) a pin formed on each side of the base,
      (ii) a hole formed in each side of the cover for receiving each pin, and
      (iii) a rounded back on the base,
   (b) a latch mechanism having
      (i) a latch projection formed perpendicularly on the front of the cover within the area defined by the cover, and
      (ii) an interference recess formed in the front of the base between two latch members and within the area defined by the base for receiving the latch projection, wherein the latch projection is inserted into the recess between the two latch members in a direction substantially perpendicular to the base during closing,
   (c) gripping means for facilitating gripping of the cassette storage container during opening and closing having
      (i) a first and second indentation formed along part of the outside front of the cover, and
      (ii) first and second serated projections formed along part of the outside front of the base adjacent to the first and second indentations, respectively, and
   (d) means for limiting the play between the sides of the cover and the sides of the base having inclined ribs formed on each side of the base for abutting each side of the cover in the closed position.

2. The videotape cassette storage container as recited in claim 1, wherein the cover is transparent and the base is opaque.

* * * * *